UNITED STATES PATENT OFFICE.

JOSEPH N. DAUDELIN, OF ST. HYACINTHE, QUEBEC, CANADA, ASSIGNOR TO HORACE DUSSAULT, OF LEVIS, CANADA.

SOLDER.

989,573.  Specification of Letters Patent.  Patented Apr. 18, 1911.

No Drawing.  Application filed May 31, 1910.  Serial No. 564,034.

*To all whom it may concern:*

Be it known that I, JOSEPH N. DAUDELIN, a subject of Great Britain, residing at St. Hyacinthe, in the Province of Quebec, Canada, have invented certain new and useful Improvements in Solder; and I do hereby declare that the following is a full, clear, and exact description of the invention, such as will enable others skilled in the art to which it appertains to make and use the same.

The invention to be hereinafter described relates to solders and more particularly to a solder adapted to join practically all the common or well known metals, including especially aluminium.

Broadly speaking, it comprises a mixture of silver, phosphorus, copper, lead, tin, aluminium, and zinc; in certain approximate proportions.

In order to more clearly disclose the composition of the invention, and the method of mixing the various ingredients, reference should be had to the following description setting forth the same in its preferred form, according to extensive experiments and experience.

The main objects of the invention are to provide a solder having great tensile strength, one which will run easily, one which may be used equally well on aluminium and many other metals in common use, one which has a very low coefficient of expansion, one which is homogeneous throughout, one which will not easily corrode, one which will give a smooth, even surface, and one presenting great toughness without being brittle.

By actual experience and a long series of careful experiments and tests the following materials in about the proportions given have been found to be the best combination to obtain the desired result: 22 grains of silver, 42 grains of phosphorus, 238 grains of copper, 1338 grains of lead, 5051 grains of tin, 50 grains of aluminium, 939 grains of zinc.

The silver hardens and adds strength to the solder. More than this proportion of silver raises the fusing point of the solder so that it will not run easily when used with a soldering iron. A smaller proportion does not give the required strength. The hardening effect of the silver is particularly desirable during the casting operation when the solder is being formed into bars and the like.

The phosphorus acts as a combining or intermixing agent. It makes a more homogeneous composition; one of greater uniformity throughout. This, of course, gives a smooth surface or finish and a more uniform joint when the solder is used. A less proportion of phosphorus produces a solder of a higher fusing point and therefore less workable with the soldering iron. More phosphorus weakens the solder so that it disintegrates and does not last so long.

The copper acts to toughen the solder and render it less brittle so that the seam or joint will stand working without injury, after it is soldered. The copper also acts to prevent corrosion. A greater proportion of copper will raise the fusing point of the solder so that it will be unworkable, or, at least, very hard to work with a soldering iron. A greater proportion of copper will also decrease the adhesive properties of the solder. A smaller proportion of copper renders the solder less tough, makes it more subject to corrosion, and gives a much weaker joint.

The lead makes the solder run freely and adhere to the joints of most of the known metals, except aluminium. A greater proportion of lead makes the solder weak, too easily fusible, and partially destroys its adhesive qualities. A smaller proportion of lead acts reversely.

Tin is used as the body or foundation of the solder and should not be materially changed from the proportion given, if the best results are to be obtained.

Aluminium is used to enable the solder to adhere to aluminium metal so that the solder may be used in making joints of pieces of aluminium metal as well as in making joints of pieces of other metals. A greater proportion of aluminium renders the solder somewhat disintegrated and less homogeneous, while a less proportion of aluminium will decrease the ability of the solder to adhere to aluminium.

The zinc is used as customary in solders, to assist in adhesion of the solder to other metals. Zinc will insure adhesion to the great majority of common metals, except aluminium.

In making the solder, the silver, copper, phosphorus, tin, and aluminium are all put into a melting pot or crucible and thoroughly melted. Then the lead and zinc are put into these molten metals and so fused. Or, if desired, the two groups of metals are melted separately and then, while molten, are mixed together. The reason for melting the silver, copper, phosphorus, tin, and aluminium, separately, is because of their high melting points. If the lead and zinc were placed in the same crucible for simultaneous melting they would be almost completely volatilized before the silver, copper, phosphorus, tin, and aluminium had begun to fuse.

It is thought that the ingredients and method of preparation, and use of the invention will be clear from the preceding detailed description.

Slight changes may be made in the variations of the proportions given without departing from the field and scope of the invention, and it is meant to include such within this application wherein a preferred form has been disclosed.

Having thus fully described my invention, what I claim as new and desire to protect by Letters Patent is:

A solder of the character described consisting of a mixture of silver 22 grains, phosphorus 42 grains, copper 238 grains, lead 1338 grains, tin 5051 grains, aluminium 50 grains, and zinc 939 grains.

In witness whereof I have hereunto set my hand in the presence of two witnesses.

JOSEPH N. DAUDELIN.

Witnesses:
 L. A. GAUVIN,
 E. J. GAUVIN.